United States Patent [19]
Judy et al.

[11] Patent Number: 5,905,838
[45] Date of Patent: May 18, 1999

[54] DUAL WINDOW WDM OPTICAL FIBER COMMUNICATION

[75] Inventors: Arthur F. Judy, Atlanta; David Kalish, Roswell; Raymond Bradfield Kummer, Lilburn; David Wayne Peckham, Norcross, all of Ga.; William Alfred Reed, Summit, N.J.

[73] Assignee: Lucent Technologies Inc., Murray Hill, N.J.

[21] Appl. No.: 09/025,195

[22] Filed: Feb. 18, 1998

[51] Int. Cl.$^6$ ..................................................... G02B 6/02
[52] U.S. Cl. .......................... 385/123; 385/124; 385/100; 385/126; 359/109
[58] Field of Search ................................. 385/123, 124, 385/125, 126, 127, 128, 100, 24; 359/109, 113, 114, 115

[56] References Cited

U.S. PATENT DOCUMENTS

| | | |
|---|---|---|
| 4,217,027 | 8/1980 | MacChesney et al. . |
| 4,372,647 | 2/1983 | Okamoto et al. . |
| 4,435,040 | 3/1984 | Cohen et al. . |
| 5,327,516 | 7/1994 | Chraplyvy et al. . |
| 5,611,016 | 3/1997 | Fangmann et al. ..................... 385/100 |
| 5,623,508 | 4/1997 | Grubb et al. ................................. 372/3 |

OTHER PUBLICATIONS

M. Yamada, et al., "Broadband and gain–flattened amplifier composed of a 1.55 μm–band and a 1.58 μm–band $Er^{3+}$–doped fibre amplifier in a parallel configuration," *Electronics Letters*, Apr. 10, 1997, vol. 33, No. 8, pp. 710–711.

P. B. Hansen, et al., "High sensitivity 1.3 μm optically preamplified receiver using Raman amplification," *Electronics Letters*, Nov. 7, 1996, vol. 32, No. 23, pp. 2164–2165.

K. S. Kim, et al., "Measurement of the nonlinear index of silica–core and dispersion–shifted fibers," *Optical Letters*, Feb. 15, 1994, vol. 19, No. 4, pp. 257–259.

K. Okamoto, et al., "Dispersion Minimisation in single–mode fibres over a wide spectral range," *Electronics Letters*, Oct. 25, 1979, vol. 15, No. 22, pp. 729–731.

Y. Sun, et al., "An 80 nm Ultra wide Band EDFA With Low Noise Figure And High Output Power," ECOC 97, Sep. 22–25, 1997, Conference Pub. No. 448, pp. 69–72.

*AT&T Lightguide Cable*, Issue 9, Dec., 1990, pp. 14, 19, 21.

*Primary Examiner*—Phan Palmer
*Attorney, Agent, or Firm*—George S. Indig

[57] ABSTRACT

Simultaneous dense WDM operation in both the 1310 nm and 1550 nm transparency windows of silica-based optical fiber, is enabled by a fiber design providing for nulled dispersion within a critically positioned wavelength range. Design provides for values of dispersion in both windows sufficiently low for desired per-channel bit rate, and, at the same time, sufficiently high to maintain effects of non-linear dispersion within tolerable limits for WDM operation. Fiber fabrication and system design are described.

18 Claims, 9 Drawing Sheets

DUAL WINDOW WDM OPTICAL FIBER COMMUNICATION

FIELD OF THE INVENTION

Simultaneous wavelength division multiplex operation within the 1310 nm and 1550 nm transparency windows of silica-based optical fiber.

BACKGROUND OF THE INVENTION

A number of noteworthy developments have come into confluence to result in state-of-the-art optical fiber communication systems. Wavelength division multiplexed (WDM) systems provide for per-channel bit rates of 2.5 Gb/sec with four channels of 100 GHz separation which, together, constitute a spectral band sufficiently narrow to permit simultaneous amplification of the entire WDM channel set by individual erbium-doped fiber amplifiers (EDFA). Several amplifier spans, each of 100 km and greater length, are combined to require terminals only at distances of 500 km or more.

While some analog operation persists, new system design emphasizes digital transmission, so that capacity is ordinarily discussed in terms of bit rates. It has been recognized that a primary limitation on capacity is spreading of individual bits, caused by chromatic dispersion, i.e., differing wavelength-dependent group velocities for different wavelength components of the spectrum making up the pulse. The dispersion limit on bit-rate, or alternatively on distance between terminals (spans), corresponds with a degree of spreading sufficient to result in overlap between successive bit positions. Chromatic dispersion is lessened by use of laser sources of minimal spectral emission bandwidth. From the fiber standpoint, the fact that the natural material dispersion null point of silica—the basic material of which optical fiber is made—occurs within its 1310 nm transparency window, resulted in emphasis on operation at such a system wavelength.

At this stage, 1310 nm operating systems were loss-limited, so that decreased fiber attenuation would permit increased span length. It was known that the 1550 nm window offered decreased loss, but that significant dispersion at wavelengths in that region would now result in systems that were dispersion-limited, in turn preventing any advantage in span length due to reduced loss for contemplated bit rates, and signaling study of means to lessen dispersion. The desire for operation in the 1550 nm window was satisfied by a new fiber design—"dispersion-shifted fiber" (DSF). This fiber depends upon the combination of two opposite influences—on the combination of "waveguide dispersion" with the naturally occurring silica "material dispersion". Appropriate fiber design increased the magnitude of the waveguide dispersion to offset the positive dependence of the material dispersion at the greater wavelength—so as to "shift" the dispersion null point from 1310 nm to 1550 nm. The objective was attained, DSF replaced unshifted fiber (USF) for sophisticated, long-haul systems.

The desire to increase capacity was largely directed to WDM operation, with its multiple-channel operation, now in the lower-loss 1550 nm window. At the same time, a competing effort looked to the possibility of simultaneous operation in both windows, as a means of increasing capacity. Recognizing the significance of chromatic dispersion as the primary limitation on bit-rate, and in recognition of the universally-acclaimed success of DSF which enabled operation at 1550 nm by nulling dispersion at that wavelength, the effort took the form of attempting to null the dispersion simultaneously at both wavelengths. The result was the dispersion flattened fiber (DFF), which, analogous to DSF, depended on crossover between waveguide dispersion and material dispersion—but now required two crossovers, one within each window.

Emergence of the EDFA, with its passband in the 1550 nm window, increased the importance of moving system operation to this region. That amplifier, with its passband of sufficient width for simultaneously amplifying member channels of a WDM set, offered the first practical WDM operation. (By all reports, this amplifier continues to be preferred, although study has made significant inroads on alternative rare-earth doped devices and also on amplifiers based on Raman effect. See *Elec. Lett.*, Vol. 32, No. 23, pp. 2164–2165 (Nov. 7, 1996).)

The next phase was truly remarkable, effectively ending dominance of DSF, and with it, the DFF with its promise of dual-window operation.

TrueWave® fiber is one commercial name given the "Non-Zero Dispersion" fiber (NZF) which has largely replaced DSF for state-of-the-art use. U.S. Pat. No. 5,327,516, first teaches that DSF precludes expected high-capacity WDM operation by reason of the very same nulled chromatic dispersion recommending it for highest-capacity single-channel operation. It then identifies four-wave mixing (4 WM) as the primary reason for failure of WDM to meet capacity expectations in DSF systems. 4 WM, a non-linear effect, is due to interaction between pulses of adjoining channels, which, in introducing sum and difference signals, reduces power level of the two interacting channels. It is of particular consequence for usual systems, providing for constant channel-to-channel spacing (for "evenly spaced" channels), in which wavelengths of such spurious signals coincide with carrier wavelengths of other channels of the WDM set, resulting in superimposition and reduced signal-to-noise ratio. It then proposes substitution of NZF with its small but critical range of chromatic dispersion. Intended for long-haul operation at a system wavelength of 1550 nm, the specified dispersion at that system wavelength, is shown to be sufficiently low as between components of a pulse spectrum so as to permit contemplated per-channel bit rates, while at the same time introducing sufficient dispersion to result in periodic phase cancellation between channels of the WDM set, and to lessen the magnitude of transferred signals due to 4 WM. (4 WM requires simultaneous presence of bits in interacting member channels—the attained magnitude of the growing spurious signal increasing for increasing time in phase. Dispersion as between channels limits interaction times, and accordingly sets a limit on the cumulative magnitude of the spurious 4 WM signals.)

The art has continued to progress. With emphasis on broadened transmission bandwidth, amplification is, to lesser extent, satisfied by the traditional EDFA. Raman amplification or, alternatively, amplification based on rare earth dopant, but using praseodymium in lieu of erbium (e.g., the praseodymium-doped fluoride fiber amplifier), shows promise of satisfying the desire for WDM operation within the 1310 nm window. Other alternatives have been investigated—as an example, erbium-doped fluoride glass shows evidence of improved gain flattening over the amplification band in the 1550 nm window.

It is widely recognized that advantages of long haul optical communication systems might continue to be of value for transmission over shorter distances. The trend toward "all optical networking" is expected to result in replacement of copper for local access and in metropolitan systems. Needs in such systems would be served by very large WDM sets—perhaps a hundred or more channels—perhaps before such large capacity is seen in long haul systems.

SUMMARY OF THE INVENTION

A new silica-based fiber, here referred to as "MetroWave Fiber" (MWF), enables dual window WDM operation in medium and short distance systems, e.g., in metropolitan systems, with the contemplated large numbers of closely spaced channels desired. Properly regarded as a "dual window NZF", it offers dispersion values, at system wavelengths in both transparency windows, which are within the critical range needed both for acceptable per-channel bit rates and for acceptably low cumulative values of spurious signals due to 4 WM among WDM channels. Two contributions are responsible: the first, the shifting of the dispersion null point to a position intermediate the 1310 nm and the 1550 nm operating windows; the second, reducing the slope of the dispersion v. wavelength curve in order to maintain desired magnitude of dispersion in broad wavelength regions of both windows. Results may be tailored to favor either window, or absolute values of dispersions of opposite sign may be balanced. The mechanisms are readily understood by the worker of average skill, and are readily implemented.

Design needs of MWF are readily satisfied by present commercial fabrication, e.g., with modified chemical vapor deposition (MCVD) (U.S. Pat. No. 4,217,027), taking advantage of the design flexibility offered by that process. Independently fabricated overcladding tubes, conventionally used together with MCVD core rods in the formation of composite preforms from which NZF fiber is then drawn, are advantageous for MWF as well.

MWF, at least in systems of modest length—e.g., systems to 300 km between terminals—represents reemergence of the promise of dual-window operation. Taken together with other developments, resulting systems, with their simultaneous many-channel WDM operation within both the 1310 and 1550 nm windows, offer system capacities, until now unattainable. The new fiber offers capability of operation with a hundred or more channels, each operating at bit rates $\geq$2.5 Gb/sec.

In terms of likely initial use—in metropolitan systems—nodes (e.g. containing optical amplifiers and or provision for add/drop) may be spaced by distances of tens of km between nodes, with perhaps 8–16 nodes forming a typical Metro Backbone ring. The possibility exists that the principles of MWF design will find application in long-haul use. Also, while emphasis is certainly on digital operation, the fiber offers advantage in analog operation—either alternative to or simultaneous with digital operation.

Terminology

Figure 1:
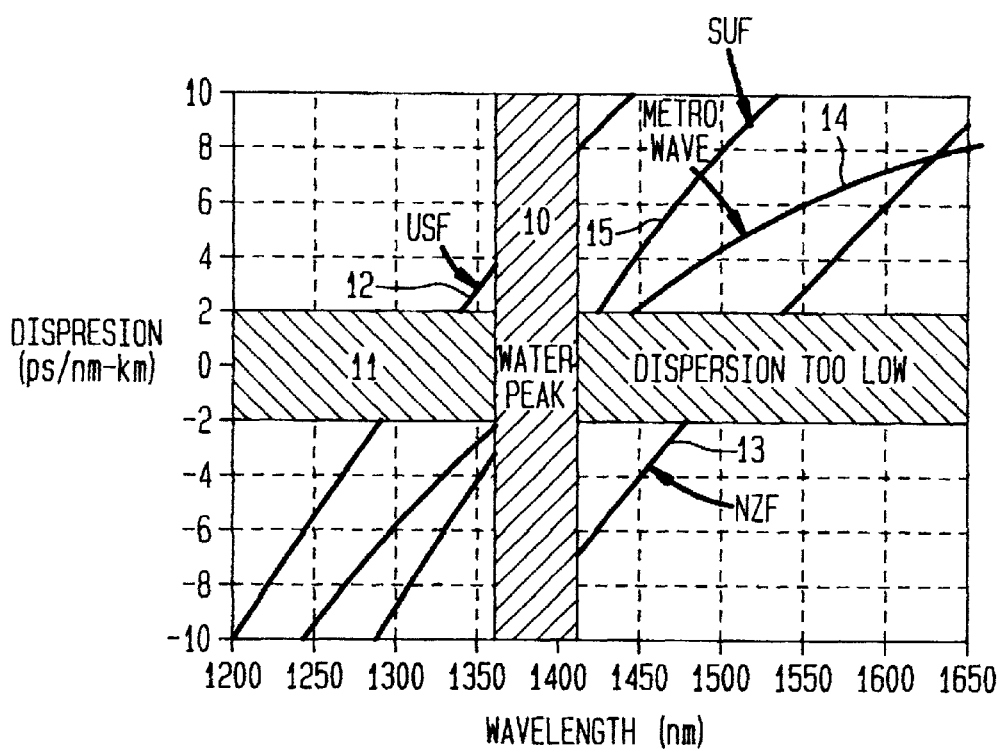
FIG. 1, on coordinates of chromatic dispersion on the ordinate and wavelength on the abscissa, is a plot of typical characteristics for various fiber designs, including MWF, with plotted data extending over a wavelength range encompassing both windows.

Dispersion—Without a modifier, refers to chromatic dispersion, a linear effect by which different spectral components of a transmitted signal have different group velocities—generally in fiber structures under discussion, as dependent on the combined effects of material properties (material dispersion) and fiber design (waveguide dispersion). In digital systems, primarily addressed, dispersion causes pulse spreading and limits capacity.

Non-Linear Dispersion—Signal distortion which increases more than linearly—e.g., quadratically—as a function of increasing power density. 4 WM is a significant form of non-linear dispersion here addressed, constituting the main capacity limitation on state-of-the-art WDM systems.

Dispersion Compensation—Lessening of chromatic dispersion by means of successive series-connected fiber lengths of opposite sign of dispersion—commonly taking the form of concatenation, using alternating lengths of fiber of positive dispersion and negative dispersion (with alternating fibers of the same order of magnitude of dispersion), e.g., by use of the balanced cable of U.S. Pat. No. 5,611,016 (which contains individual bundles of positive dispersion and negative dispersion fiber). Alternatively, compensation makes use of relatively short lengths of compensating fiber of large order of magnitude and of opposite sign both relative to fiber being compensated. Preferred systems of the invention, discussed, generally do not provide for dispersion compensation, although neither form of compensation is precluded for still greater system capacity.

Wavelength Division Multiplexing (WDM)—Providing for multi-channel operation within a single fiber. Channels of a set are sufficiently closely spaced to enable simultaneous amplification by an individual amplifier. Contemplated spacings, e.g., $\leq$100 GHz between adjacent channels of a set, are descriptive of "Dense Wavelength Division Multiplexing" (DWDM), and the term "WDM", without a modifier, is intended to be inclusive of DWDM. Fiber (MWF) and systems of the invention are designed to support at least one WDM set in each of the 1310 nm and 1550 nm windows. Without a modifier, the term is not intended to be generic to "coarse WDM".

Coarse WDM—Providing for multi-band operations within a single fiber. The term refers to combining/ separating WDM channel sets (or "bands") associated with individual optical amplifiers—so that a coarse WDM provides for combining/routing multiple bands associated with multiple amplifiers. The term is used with reference to multiple bands within a window, as well as to bands within separate windows.

Silica-Based Fiber—Optical fiber for which silica is the major glass-forming oxide—generally constituting at least 90 mole percent of the fiber composition (exclusive of coating/s). State-of the-art optical fiber is "silica-based".

Delta ($\Delta$)—Relative index of refraction values—as used for measuring fiber profile, the fractional value of change in index from that of the outer cladding, divided by the index of the outer cladding.

Single-Mode Fiber—Optical fiber supporting only a single mode—the fundamental mode—at the intended system wavelength. Fiber of the invention is invariably single-mode down to a wavelength shorter than that of intended operation in the 1310 nm window (down to a "cut-off wavelength" at which the fiber becomes two-mode).

Core—Innermost region of the fiber with primary responsibility for guiding. It is constituted of material of greater index of refraction than that of the clad. Its radial dimension is from the center of the fiber to the onset of material of index equal to or less than that of the outer cladding. An idealized core contains no material of as low a value of refractive index as that of the outer cladding, although unintended deviations such as the dip characteristic of MCVD may conceivably result in a drop to that value.

Outer Cladding—Without a modifier, the outermost and major part of the fiber—invariably of lesser index than that defining the core. Its value of refractive index is generally used as basis for the "delta" values which, plotted against radius, constitute the common fiber profile diagram.

Cladding—The entirety of the fiber outside the core—in conventional terminology, not including coatings.

Window—Without a modifier, a high transparency (or low attenuation) wavelength region of the transmitting medium—here of an optical fiber. In silica-based fiber, of primary interest for relevant communication systems in the foreseeable future, there are two such windows, often identified as the 1310 nm and the 1550 nm windows.

1310 nm Window—Range of wavelength values considered to define the window including 1310 nm—varying to some extent depending on system needs; for illustrative purpose, from 1260 nm to 1360 nm.

1550 nm Window—Range of wavelength values considered to define the window including 1550 nm—varying to some extent depending on system needs; for illustrative purposes, from 1460 nm to 1620 nm.

Operating Window—To large extent a property determined by fiber design, defines that range of wavelength values of both dispersion and transparency appropriate to system operation. For WDM operation, the operating window must avoid dispersion values either too low (from the standpoint of 4 WM) or too high (for specified bit-rate/distance). There is an operating window both at 1310 nm and at 1550 nm.

Terminal or Terminal Equipment—Equipment entailing conversion from electrical to optical (E/O conversion) or from optical to electrical (O/E conversion)—i.e., as between the optical signal transmitted through a fiber and its electrical analog as introduced prior to conversion or extracted after conversion. A terminal may be at a terminus of the system—operating as transmitter or receiver. Alternatively, it may define a terminus of a "fiber span" where it may operate as a "repeater" between successive fiber spans—as needed to avoid excessive growth in dispersion or excessive deterioration in S/N.

Node—position providing signal access, e.g. for optical amplification, for addition or routing (add/drop), or for spectral inversion. As the term is used in connection with metropolitan systems, signal processing at a node does not provide for E/O or O/E conversion (the term, "terminal" being reserved for that purpose).

Span—Without a modifier, the term specifies fiber length between terminals—between a first terminal providing for E/O and a second terminal providing for O/E. A span is generally constituted of a series of amplifier spans.

Amplifier Span—A fiber length defined by optical amplifiers or, alternatively, one optical amplifier and one terminal—may be synonymous with "nodal span".

DETAILED DESCRIPTION

General

The primary thrust of the advance is a fiber suitable for medium length, high speed, Wavelength Division Multiplexing (WDM) transmission simultaneously in both the 1310 nm and 1550 nm windows. Analogous to NZF, the new fiber has a needed dispersion—here specified as of absolute magnitude between 1 and 8 ps/nm-km, now in regions of both windows. As magnitude of dispersion decreases, 4-wave mixing (4 WM) becomes more limiting for WDM systems. As it increases, its impact on bit-rate or propagation distance becomes significant.

None of today's commonly available fibers are satisfactory for dual window, high speed, WDM. This is evident from FIG. 1, which plots typical dispersion values for a variety of fiber types as a function of wavelength. The figure includes "forbidden regions" representing regions inappropriate for system use based on common design criteria—region 10 of too great a loss, e.g., greater than 0.5 dB/km, due to —OH absorption at the "water peak", and region II of too low dispersion shown as in the range of −2 to +2 ps/nm-km. (The ±2 ps/nm-km values of dispersion boundary in the Figure refer to preferred minima. System designs may provide for WDM channels of extreme dispersion values of ±1.5 ps/nm-km or even ±1 ps/nm-km. Plotted limits for dispersion and water peak are for purposes of discussion—are not intended as rigorous limits. Values discussed as unacceptable are, in a sense, arbitrary—are the consequence of compromise, e.g., between capacity and span length.)

As seen from curve 12, unshifted single-mode fiber (USF) has too low a dispersion at 1310 nm to allow WDM and too high a dispersion at 1550 nm to allow high speed transmission without the use of external dispersion compensation. Similarly, from curve 13, NZF dispersion is too large at 1310 nm, and the particular commercial product (TrueWave®), plotted, has too low a dispersion, even for operation in the range of 1540–1480 nm, within the 1550 nm window. Furthermore, both fiber types are limited in their operating windows by a large dispersion slope that limits usable bandwidth to a relatively narrow band of wavelengths within the desired dispersion range of 1.0–8.0 ps/nm-km—although to a bandwidth sufficient for present-day operation which is generally limited to a single WDM channel set. MWF, curve 14, with its flattened slope and its zero dispersion wavelength of about 1400 nm, permits WDM in both windows—with operation over a bandwidth at least comparable both with USF in the 1310 nm window and NZF in the 1550 nm. window. Curve 15 is plotted for a fiber considered in conjunction with the invention—"shifted but unflattened" (SUF), i.e., shifted to the same $\lambda$=1400 nm crossover as for MWF, but retaining the dispersion v. wavelength slope characteristic of USF. SUF has dual window capability, although with a more restricted total operating range than MWF.

Fiber Design

Locating the dispersion null point intermediate the 1310 nm and 1550 nm windows—in present day fibers, in a region of high loss due to —OH absorption—an invariant requirement for MWF, is readily accomplished. Use is made of the same mechanism as in DSF (or in usual NZF) to shift the dispersion null point away from that dictated solely by material dispersion. Zero dispersion, now at the nominal wavelength value of $\lambda_0=1400$ nm, representative of a usual range of from 1350 nm to 1450 nm, may yield balanced values of dispersion, values within the range of 1.0–8.0 or preferably 2.0–7.0 ps/nm-km in both windows—of negative sign in the 1310 nm window and of positive sign in the 1550 nm window. MWF is properly regarded as a dual window NZF design, and the new fiber may satisfy certain NZF requirements for operation at 1550 nm. However, provision for simultaneous operation in the 1310 nm window may result in somewhat smaller mode field diameter, and thus in effective area smaller than that of optimally designed present-day NZF. Effective areas for MWF, are generally $\geq 42$ $\mu m^2$—while they may overlap the value of 50 $\mu m^2$ typical of NZF, are typically in the range of 42–49 $\mu m^2$. (For definition of effective area, see *Opt. Lett.*, Vol. 19, No. 4, pp. 257–259 (Feb. 15, 1994).) Decreasing effective area increases power density, and, accordingly, aggravates effects of nonlinear dispersion. This compromise of small mode field, needed for single-mode operation in the 1310 nm window, and thus far required for flattened dispersion slope, results in non-linear effects which, while still tolerable for the relatively short distances envisioned for metropolitan systems, are inferior to those of optimally designed NZF.

The mechanism used for dispersion flattening in MWF may not have been used previously. While certainly related, it is regarded as different from the mechanism responsible for earlier "flattened" fiber. Attainment of the then-desired nulled dispersion in both windows was the result of two separate material-waveguide crossovers, one at 1310 nm and the other at 1550 nm. Low slope accompanied change in sign of the slope between the null points.

Attainment of "non-zero" dispersion, rather than zero dispersion at system wavelengths in the transparency windows, generally precludes dispersion null points in either window—any long-wavelength crossover is necessarily at a wavelength value well beyond that of any intended carrier wavelength in the 1550 nm window. Low dispersion slope, a requirement for all MWF designs, is a consequence of a multiple-layer structure such as that shown in FIG. 4. The depressed index region 41 is of particular importance. Low wavelength dependence of dispersion (curve 30 of FIG. 3) is due to compensation of two phenomena. In general, group delay increases with wavelength, a prime determinant of dispersion slope at system wavelengths in bulk silica and in usual silica-based fiber. It is also true however, that, with increasing wavelength, the guided mode becomes less confined to the core region—spreads out into surrounding regions. Group delay is a function of the weighted average of delays experienced by the mode across the wave front. Accordingly, increased penetration of longer wavelengths into lowered-index region 41, in reducing average index of refraction and thereby decreasing the weighted average delay time for increasing wavelength, offsets the increase in delay due to increasing wavelength (offsets the inherent material characteristic). A lowered-index region or "trench", such as region 41 specified for the purpose of lessening dispersion slope in MWF. Reduced index of refraction of the trench of 0.05%—preferably of 0.1%—relative to the outer cladding flattens the dispersion sufficiently to assure a substantial region of desired non-zero dispersion in each window (for a null point located at the nominal value of 1400 nm).

"Ring" 42—an annular region of increased index relative to that of the outer cladding 43—is likely to be included in commercial MWF. The primary purpose of this increased-index region is not dispersion flattening, but concerns minimization of bend loss. In general terms, bending loss—on the value of A at the interface of the ring and succeeding regions (here of outcladding 43) is affected by the effective index seen by the traveling wave front relative to the outer cladding, while flattening depends primarily on the characteristics of the trench itself, so that introduction of the ring may reduce bend loss without significantly impacting slope.

An illustrative specification table for MetroWave Fiber is presented:

| MWF Specification Table | |
|---|---|
| Attenuation at 1550 nm | $\leq 0.25$ dB/km |
| Attenuation at 1310 nm | $\leq 0.50$ dB/km |
| Effective area at 1550 nm | $\geq 42$ $\mu m^2$ |
| Core eccentricity | Less than or equal to 0.8 $\mu m$ |
| Cladding diameter | 125 ± 2.0 $\mu m$ |
| Cut-off wavelength | <1250 nm |
| Zero-dispersion wavelength | 1350 nm–1450 nm |
| Dispersion at 1310 nm | −3.0 to −8 ps/nm-km |
| Dispersion at 1550 nm | +3.0 to +8 ps/nm-km |
| Dispersion slope at 1550 nm | 0.01–0.05 ps/nm$^2$-km |
| Macrobendingloss at 1310 nm | <0.5 dB (1 turn, 32 mm) |
| Macrobending loss at 1550 nm | <0.05 dB (100 turns, 75 mm) |
| Coating diameter | 245 ± 10 $\mu m$ |
| Proof test | 100 kpsi |
| Reel lengths | 2.2, 4.4, 6.4, 8.8, 10.8, 12.6, 19.2 km |

Figure 2:
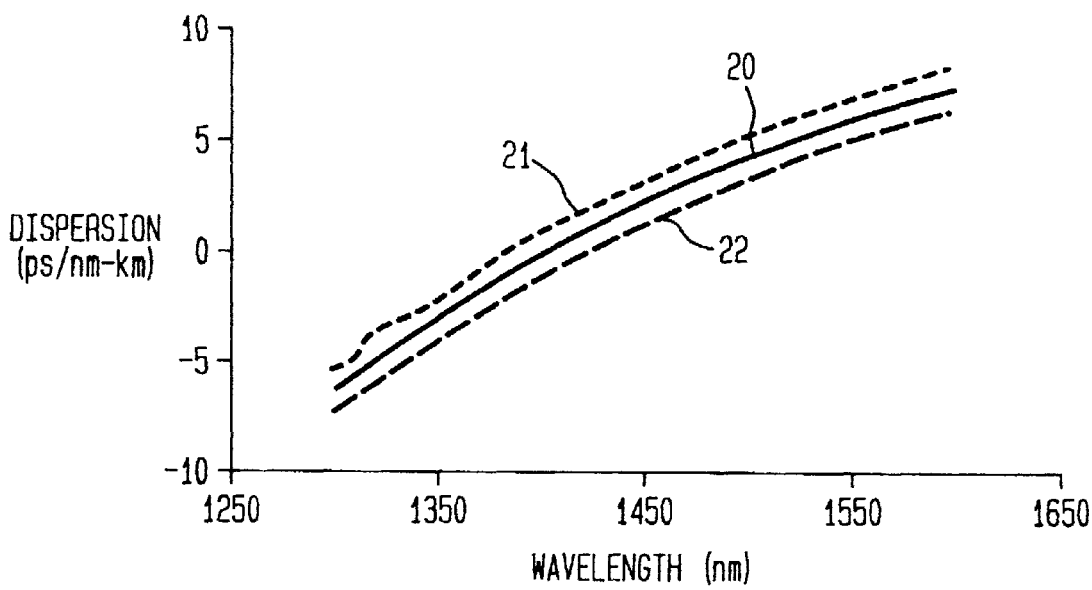
FIG. 2, on coordinates of dispersion and wavelength, are dispersion plots, showing nominal values and expected production excursions from nominal values for an illustrative MWF design.

A typical dispersion curve for MetroWave fiber is shown in FIG. 2. The nominal dispersion (solid curve 20) is about +6 ps/nm-km at 1550 nm and −6 ps/nm-km at 1310 nm. With present technology, these values of dispersion allow 10 Gb/s non-return-to-zero (NRZ) transmission for fiber lengths up to about 160 km without the need for dispersion compensation—adequate for contemplated systems over distances anticipated in metropolitan areas. At moderate power levels ($\leq 4$ dBm/channel), WDM requires about 1 ps/nm-km for channels at spacings of 100 GHz (equivalent to 0.57 nm and 0.80 nm at 1310 nm and 1550 nm, respectively), and about 4 ps/nm-km for spacings of 50 GHz (equivalent to 0.29 nm and 0.40 nm at 1310 nm and 1550 nm, respectively). With ±1 ps/nm-km production variations from nominal values (dashed curves 21, 22), yielding a dispersion range of 2 to 7 ps/nm-km, WDM operating windows (from FIG. 1) are 1260 to 1360 nm and 1460 to 1620 nm for 100 GHz spacings, equivalent to 210 and 194 transmission channels, respectively.

Figure 3:
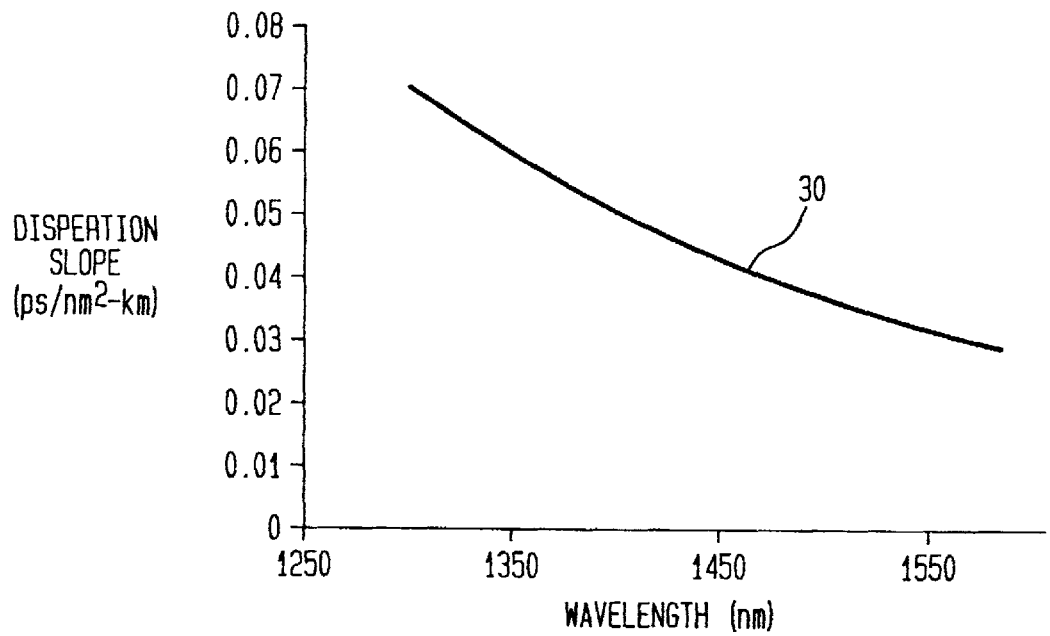
FIG. 3 plots dispersion slope as a function of wavelength for the fiber plotted on FIG. 2.

Curve 30 of FIG. 3, shows a dispersion slope of value within the approximate range of 0.03–0.04 ps/nm$^2$ -km in the 1550 nm window. As compared with a value of 0.075 ps/nm$^2$-km characteristic of NZF, the lower slope of MWF permits a comparable operating range in the 1550 nm window despite the lower dispersion null point.

Figure 4:
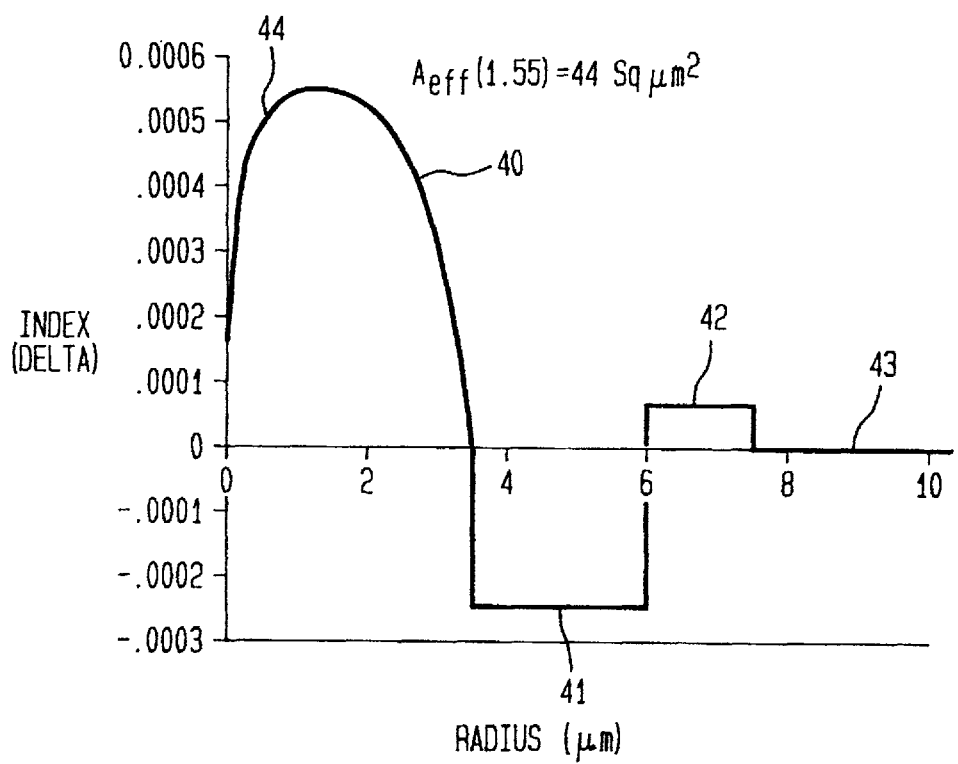
FIG. 4, on coordinates of delta value (Δ) and radial position, is a plot of index profile for the MWF of Example 1.

FIG. 4 shows normalized refractive index difference ("delta") as a function of radial position for the four-region fiber which served as the basis for the preceding figures. The germano-silica core 40 is surrounded by a trench 41, i.e., an annular region of depressed index, in this instance, composed of fluorine-doped silica. Surrounding the trench is a raised index germano-silica ring 42, in turn within outer cladding region 43—in this specific instance, of undoped silica. Core region 40 shows a depressed-index central region (or "dip") 44 characteristic of MCVD-produced fiber.

"MCVD dip" 44 serves no function, but does not unduly interfere with operation of the fiber.

The abrupt discontinuities at the region boundaries can only be approached in real fiber. In terms of the critical transition from core region 40 to trench 41, the change in index can occur over a region of less than 0.1 millimeter in a typical MCVD preform, corresponding to an index gradient of absolute value greater than 2%/mm. Agreement between the calculated results which use the idealized profile and measured results for actual fiber made from such a preform, demonstrates that MCVD is adequate for the purpose.

However, fabricating well defined fluorine-doped, depressed-index layers using the soot processes, i.e., OVD and VAD, requires modification of standard OVD or VAD if design compensation is not to be made. The high diffusivity of fluorine in the porous, unvitrified soot is a particular problem. It results in smearing (in lowered delta values) at the region boundaries during the vitrification step which, as practiced in standard OVD or VAD, is conducted on the still-particulate total deposit. Introduction of intermediate full or partial vitrification steps, before and after deposition of the fluorine doped layers constituting the trench, remedy the problem.

EXAMPLE

The structure of the fiber, or more concisely of the preform resulting in the fiber of FIGS. 1–3, is described with reference to FIG. 4. Preform profile data is consistent with operating data for the fiber (on which profiling is not conveniently conducted).

The core region 40 consists of silica doped with germanium and extends from the center to a radius of about 3.5 $\mu$m. The germanium concentration is adjusted to result in a radial variation, of the core delta as a function of radius, that can be described by the alpha profile law:

$$\Delta(r)=\Delta_0[\ 1-(r/a)^\alpha]$$

where r is radial position within the core, a is the core radius, (x is the profile shape parameter and $\Delta_0$ is the delta value at the center of the fiber disregarding the central dip 44 (the peak index value of the core). The nominal values of these parameters for this example are: a=3.5 $\mu$m, $\alpha$=5, $\Delta_0$=0.55%. The presence of the central dip is due to volatilization of germania from the exposed inner surface of the MCVD deposit during collapse and is inherent in usual MCVD processing. Although the presence of this region is unintended, its presence is assumed and its effect on the final fiber transmission properties is accounted for in the design. The germania concentration required to achieve the peak index level of 0.55% is approximately 7 weight percent. The core region of a preform fabricated by MCVD or OVD typically consists of 5 or more annular layers, each made with a separate deposition pass. The germania concentration of each layer is adjusted to yield the desired radial index grading. If fabricated using the VAD process, the burner is designed to yield the desired gradient across the axially growing core region.

Trench 41 is silica which is down-doped with fluorine. It may also contain small amounts of germania or other dopant, e.g., to lessen strain or for fine profile adjustment. The constant delta value of −0.24%, shown for the trench in FIG. 4, required a fluorine concentration of about 1.5 wt. %. The nominal width of the trench in the drawn fiber is 2.5 $\mu$m. Fabricated by MCVD (or OVD), this region consists of about four (generally identical) deposition passes. In VAD, a single, axially-grown layer forms the trench region. Achieving the well-defined fluorine-doped region with OVD or VAD is problematic because of fluorine diffusion in the highly porous soot boule. As discussed, diffusion may be minimized by partially or fully vitrifying individual regions as deposited. Vitrification at this stage may be carried out in a fluorine-containing environment to lessen volatilization-loss as well.

Ring 42 consists of silica doped primarily with germanium. The nominal delta of +0.07% requires a germania concentration of about 1 wt. %—an index increase $\geq$0.05% relative to the outer cladding is effective in limiting mode spreading, and substantially reduces bending loss. The nominal width of the ring is 1.5 $\mu$m. Here, again, this region corresponds with a few MCVD or OVD deposited layers, or with a single axially-grown VAD layer. The outercladding 43 is undoped silica. It may be consist, in its entirety, of material deposited by one of the standard vapor-transport fiber fabrication processes, or it may, in part, be produced from an overcladding tube forming part of a composite preform. The outer cladding extends from the outer diameter of ring 42 to the outer diameter of the fiber, typically of a fiber nominally of 125 $\mu$m o.d.

Table 1 summarizes the values of the 9 parameters that specify the index profile of MWF 14 shown in FIG. 1.

TABLE 1

| Parameter | Nominal Value | Expected Tolerance |
|---|---|---|
| Core $\Delta$ | 0.55% | ±0.02% |
| Core $\alpha$ | 5 | ±1 |
| Core Radius | 3.5 $\mu$m | ±0.1 $\mu$m |
| Trench $\Delta$ | −0.24% | ±0.025% |
| Trench Width | 2.5 $\mu$m | ±0.25 $\mu$m |
| Ring $\Delta$ | 0.07% | ±0.007% |
| Ring Width | 1.5 $\mu$m | ±0.25 $\mu$m |
| Outer Cladding $\Delta$ | 0.0% | N/A |
| Outer Cladding Width | 55 $\mu$m | N/A |

The values listed in the column labeled "Nominal Value" are the targets for attaining desired mode field radius, dispersion profile, and bending loss. The values listed in the column labeled "Expected Tolerance" defined the ranges required to maintain dispersion within a range of ±1 ps/nm-km about nominal values.

Table 2 lists ranges of parameter values of MWF. It should be kept in mind that values listed are minima and maxima for individual parameters, and do not represent a design prescription as taken together. For example, combining maximum values—or alternatively minimum values—of all listed parameters, will likely not result in effective design. Effective design must satisfy both shifting and slope flattening criteria described above.

TABLE 2

| Parameter | Range |
|---|---|
| Core $\Delta$ | 0.40 to 0.60% |
| Core $\alpha$ | 1 to $\infty$ |
| Core Radius | 3.0 to 4.0 $\mu$m |
| Trench $\Delta$ | −0.1 to −0.3% |
| Trench Width | 1.5 to 6.0 $\mu$m |
| Ring $\Delta$ | 0.0 to 0.3% |

TABLE 2-continued

| Parameter | Range |
| --- | --- |
| Ring Width | 1 to 5 $\mu$m |
| Outer Cladding Δ | NA |
| Outer Cladding Width | NA |

Consistent with general practice, profile values, both in the Tables and elsewhere, are in terms of delta values. This practice is useful in two regards: absolute values of index are difficult to measure; and, to first approximation, fiber parameters, with the exception of loss, scale as the relative rather than absolute values of index. Replacing the undoped silica outer cladding of the fiber of FIG. 4, e.g., with down-doped material, has no first order effect on dispersion slope so long as other regions (core, trench, ring) are changed accordingly—i.e., so long as delta values are not altered. While increasing index of the outer cladding has little affect on such properties, concomitant need to increase core dopant concentration, to maintain Δ, may increase loss to undesirable levels. MCVD facilitates attainment of such down-doped regions, e.g., by use of suitable MCVD substrate tubes and/or overcladding tubes.

Figure 5A:
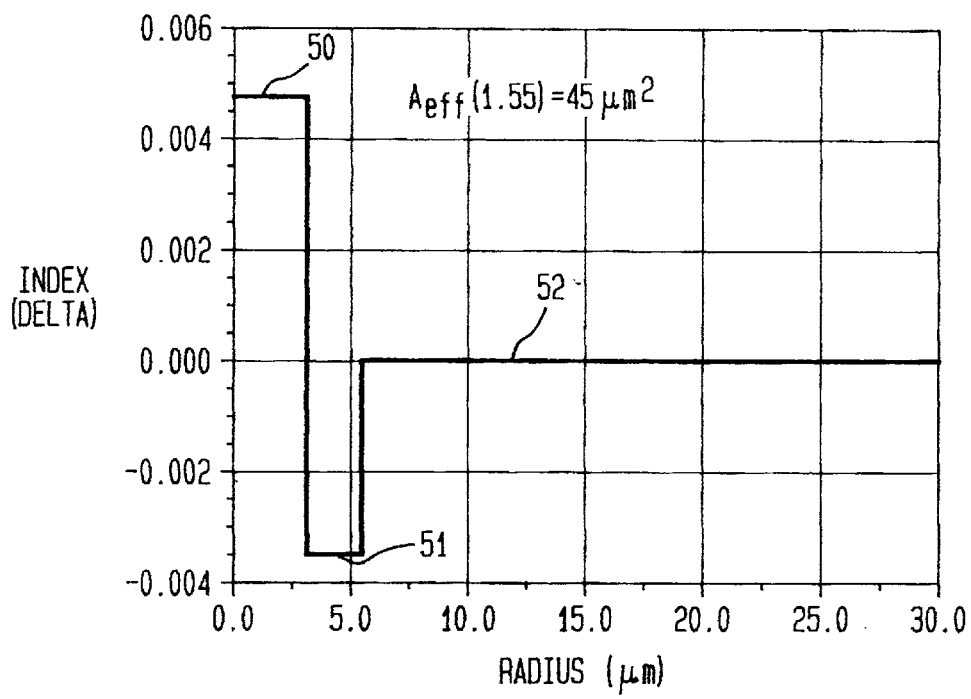
FIGS. 5A–5B, 6A–6B and 7A–7B are paired index profile plots and nominal dispersion plots for alternative MWF structures, which, taken together, serve as basis for a discussion of design variations for achieving particular operating characteristics.
Figure 5B:
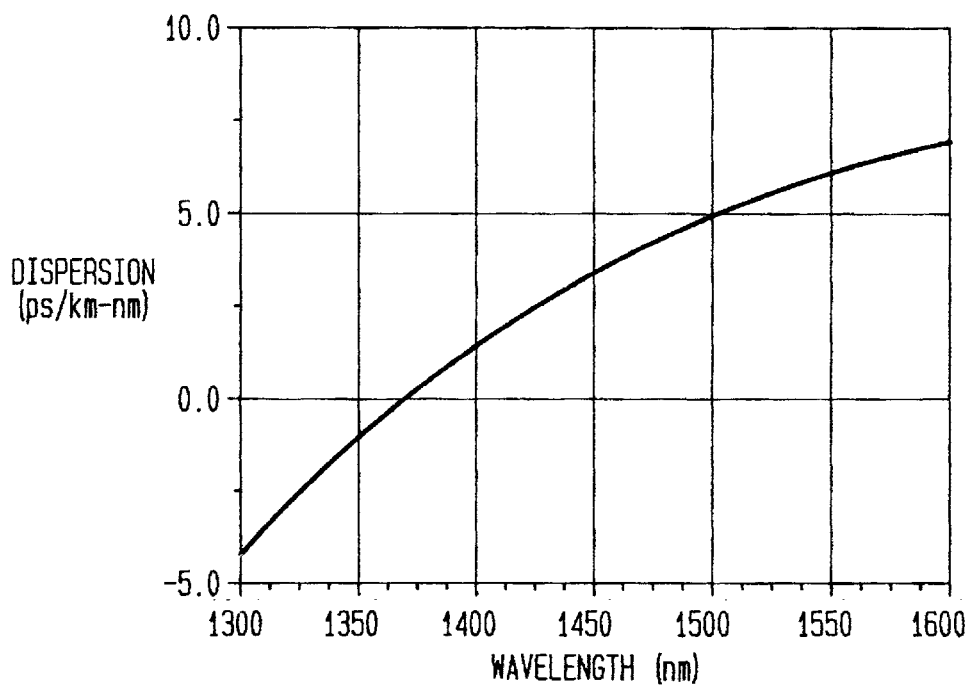
Figure 6A:
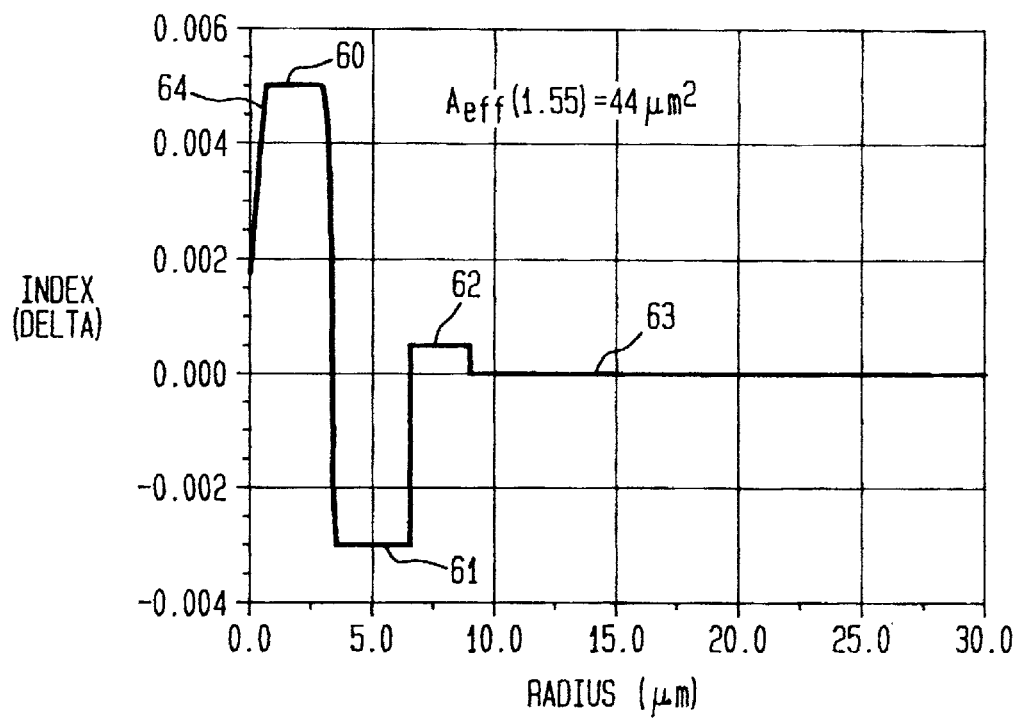
Figure 6B:
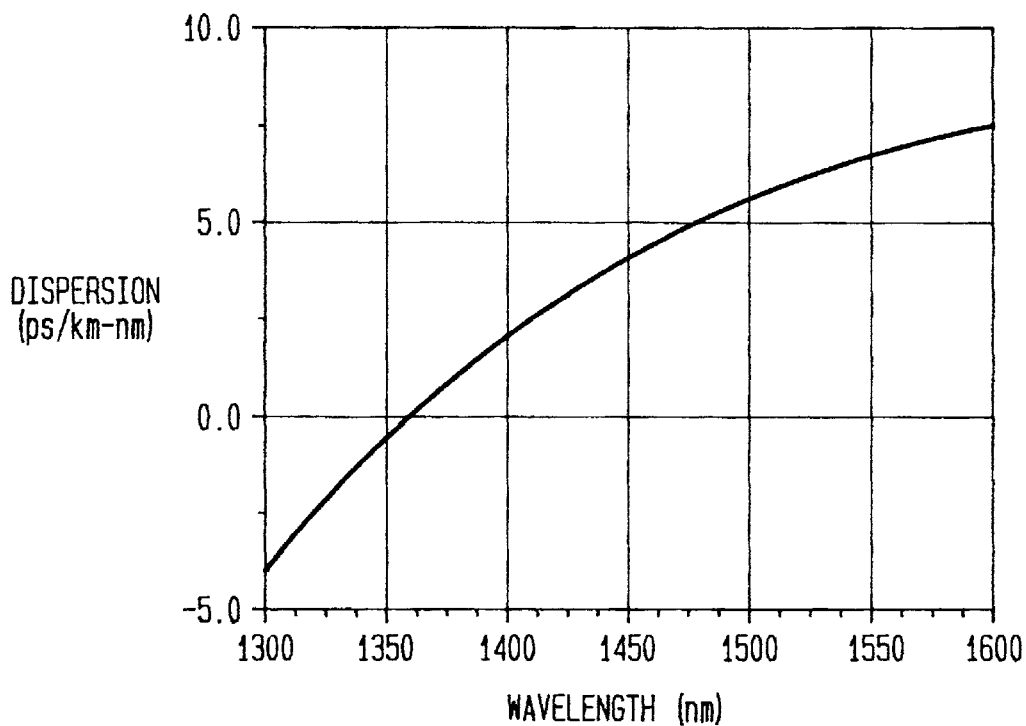
Figure 7A:
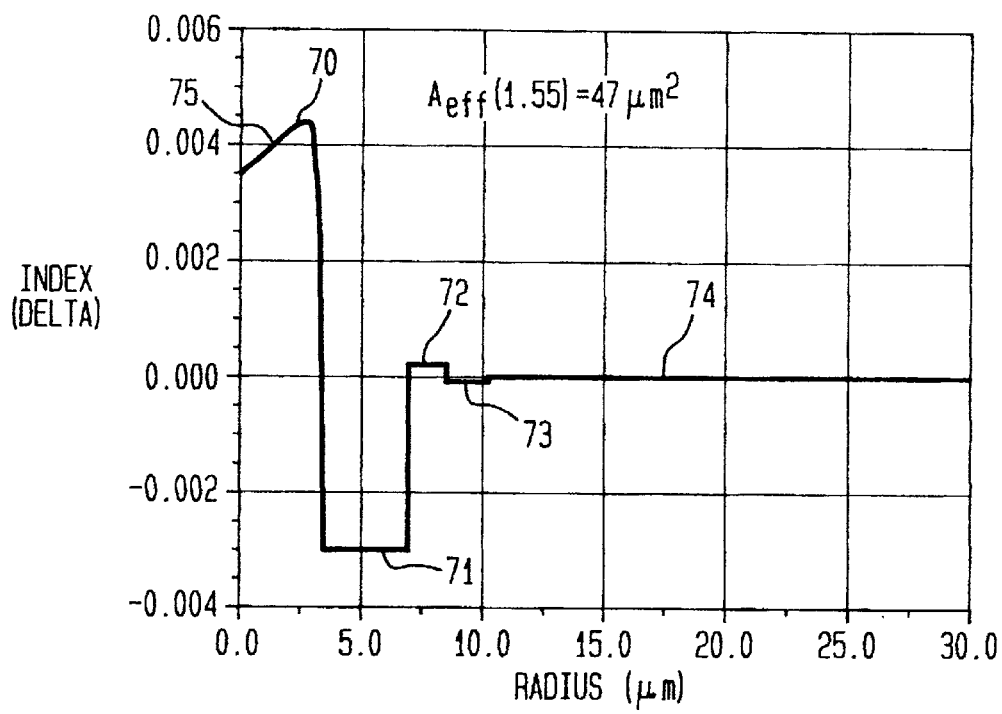
Figure 7B:
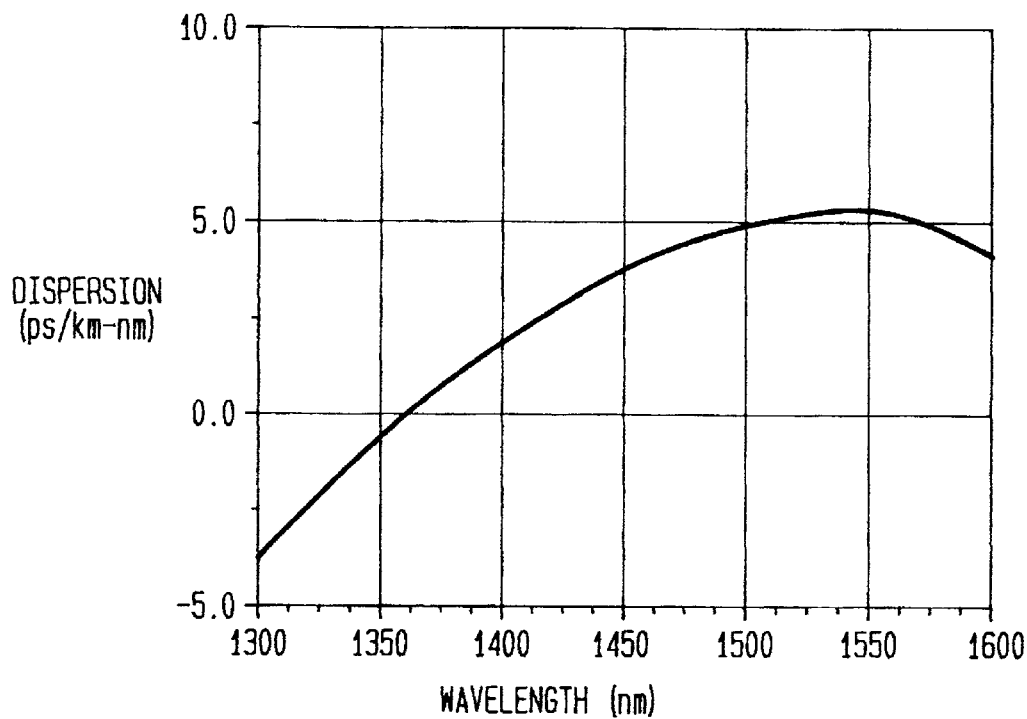

FIGS. 5A–5B, 6A–6B and 7A–7B illustrate the extensive design and dispersion variations studied. FIGS. 6A–6B are illustrative of the fiber of FIG. 4 (two annular regions, i.e., reduced index "trench" 61 and increased index "ring" 62, intermediate core 60 and outer cladding 63). FIGS. 5A–5B represent MWF designs with but a single annular region 51 (trench 51), intermediate core 50, and outer cladding 52. FIGS. 7A–7B are based on a structure providing for three annular regions 71, 72, 73 about core 70—three successive regions of successively reduced, increased, and reduced index, relative to the outer cladding 74. While the profiles of FIGS. 6A and 7A include characteristic "MCVD dips"—depressed regions 64 and 75, respectively, the schematic profile of FIG. 5 does not. Study has included a variety of profiles, of more gradual change in delta value; many including additional regions. In general, design criteria concerning such variations are consistent with general experience.

The functions of the various regions have been discussed. It is expected that commercial MWF product will necessarily include at least a first annulus—at least one "trench" of reduced index as set forth on Table 2. This first trench region is required for dispersion flattening needed for simultaneous WDM operation in both windows. It has been indicated that the second annular region—the "ring"—has the effect of increasing guiding strength (of reducing bending loss) while having little effect on flattening. The third annulus, of still lesser relative effect on flattening, has been used for "fine tuning" the fiber performance. It will be recognized that all figures show the well-defined regions of prototype structures. Real structures may show familiar variations, either intentional or unintentional—with known effect.

Figure 8:
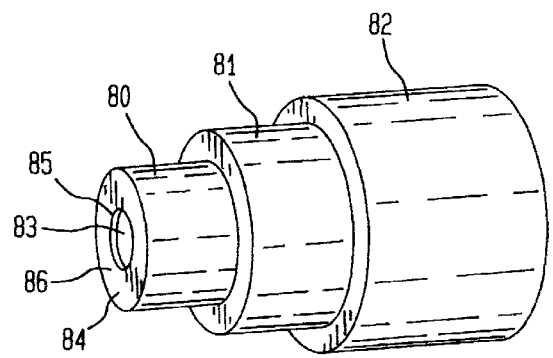
FIG. 8 is a perspective view of an MWF, dual coated in accordance with conventional practice.

FIG. 8 depicts a dual coated MWF 80, with primary coating 81 and secondary coating 82. Fiber 80 consists of core region 83 and clad region 84. The clad is shown as including trench 85 and outer cladding 86.

Figure 9:
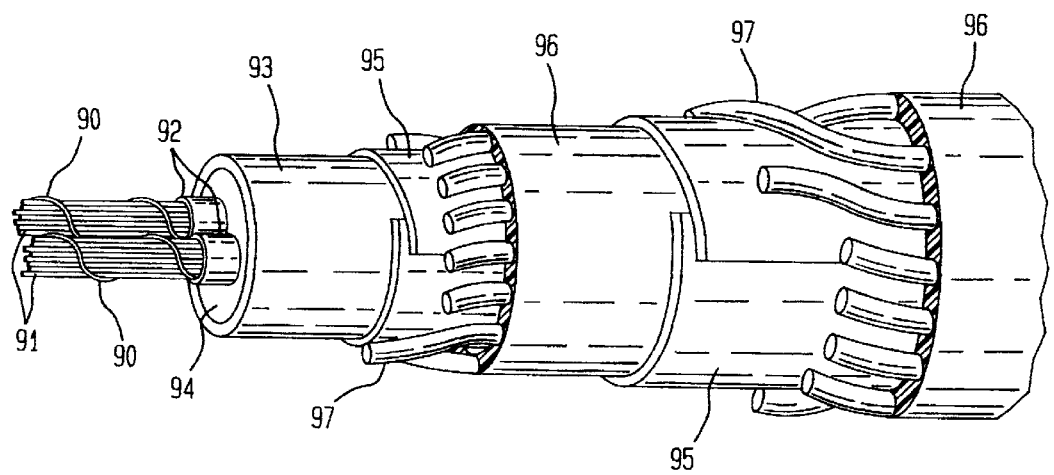
FIG. 9 is a perspective view of one form of cable structure containing grouped MetroWave fibers.

FIG. 9 depicts one form of commercial cable described in *AT&T Lightguide Cable,* December, 1990. It is constituted of two bundles 90, each bundle containing 12 color-coded fibers 91, held together by an encircling covering 92. Individual fibers 91 are of the general design of that of FIG. 8, but in this instance, include a tertiary coating provided with a color identifier. The complete structure includes cable-filling compound 94, core tube 93 and two protective structures each constituted of a water-blocking tape 95 and a polyethylene jacket 96, each structure reinforced by steel wires 97.

Figure 10:
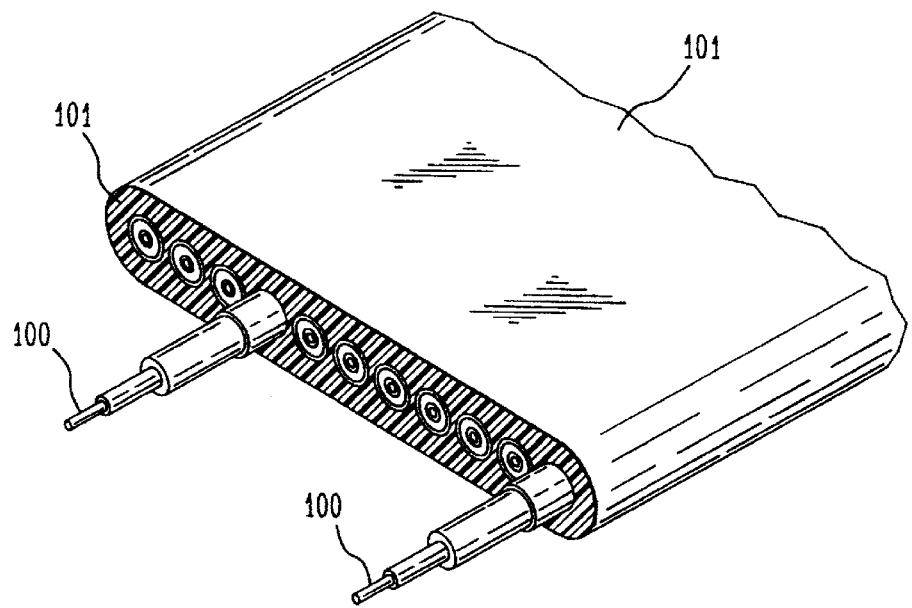
FIG. 10 is a perspective view of an AccuRibbon® parallel fiber array.

FIG. 10 shows a commercially-available parallel fiber array, known as AccuRibbon®. The commercial article consists of 12 fibers 100 and matrix material 101.

Figure 11:
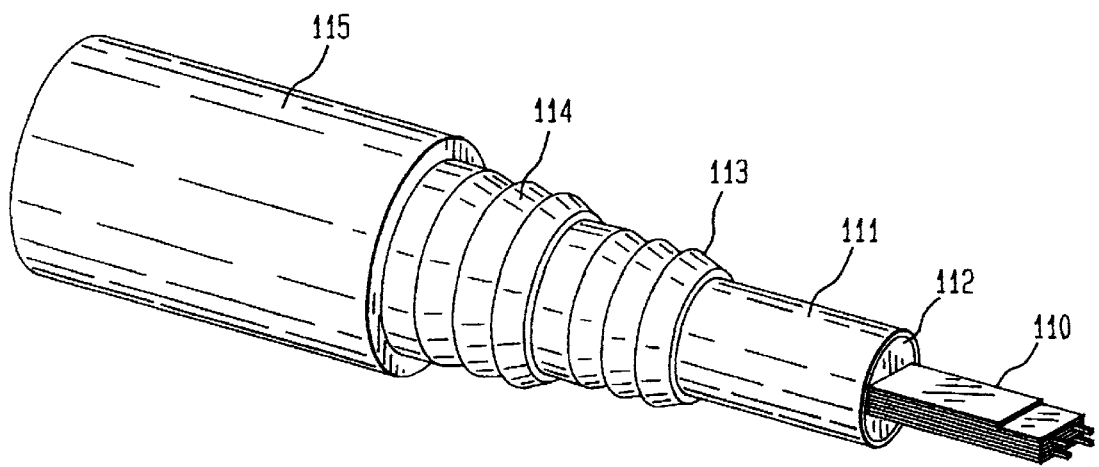
FIG. 11 is a perspective view of a cable containing several FIG. 10 fiber arrays.

FIG. 11 shows a cable containing grouped fibers in the form of planar arrays 110. Crossply sheath 111 is filled with cable-filling compound 112. The particular structure shown is an under-water armored cable, including overwrappings constituting conductive shield 113, coated stainless steel protective layer 114, and bonded jacket 115.

Fiber Fabrication

MWF designs are profiled to reduce dispersion slope. Most effective flattening relies on introduction of steep index variations. One fiber fabrication process in particular, MCVD, is useful. Inherent MCVD deposition, entailing layer-by-layer deposition and substantial consolidation (vitrification) of each layer prior to deposition of the succeeding layer, minimizes diffusion of dopant between layers—an objective to which usual soot processing, either outside vapor deposition (OVD), or vapor axial deposition (VAD), is not as well suited. Such soot processes may be modified to better enable retention of steep gradients, e.g., by periodically halting deposition and consolidating in stepwise fashion, with a consolidation step for each deposited layer or group of layers. Overcladding procedures, generally practiced with MCVD, are useful, too. Future generations of MWF are likely to use severely down-doped cladding tubes. The MCVD support tube—within which deposition takes place in the course of preform fabrication, itself, may provide down-doped (or up-doped) regions resistant to dopant migration during subsequent deposition. It is conceivable that an early described variation of soot processing, inside vapor deposition (IVD), may serve the purpose of the MCVD support tube.

Systems

The MetroWave fiber offers high-capacity system operation without need for the dispersion compensation required for dual-window operation—particularly for dual-window WDM operation—with NZF or USF. Provision for compensation—either using concatenation or by use of high-dispersion specialty fiber—in principle, at least, permits operation of NZF or USF in its "closed" window. Dispersion compensation, however, is costly and adds engineering complexity. While not equal in performance to MWF fiber, dual window operation, although of lesser capacity, is offered by a fiber which is simply shifted (but unflattened). Such a fiber, e.g., fiber 15 of FIG. 1, of dispersion slope resembling that of DSF, but without the dispersion flattening associated, e.g., with a reduced-index "trench" of MWF, has its crossover shifted to a wavelength within the water peak. Possible utilization of such a "shifted but unflattened fiber" (SUF), is contemplated in systems described. While inferior to MWF from a performance standpoint, fabrication of the fiber is less involved, resulting in cost advantage.

Figure 12:
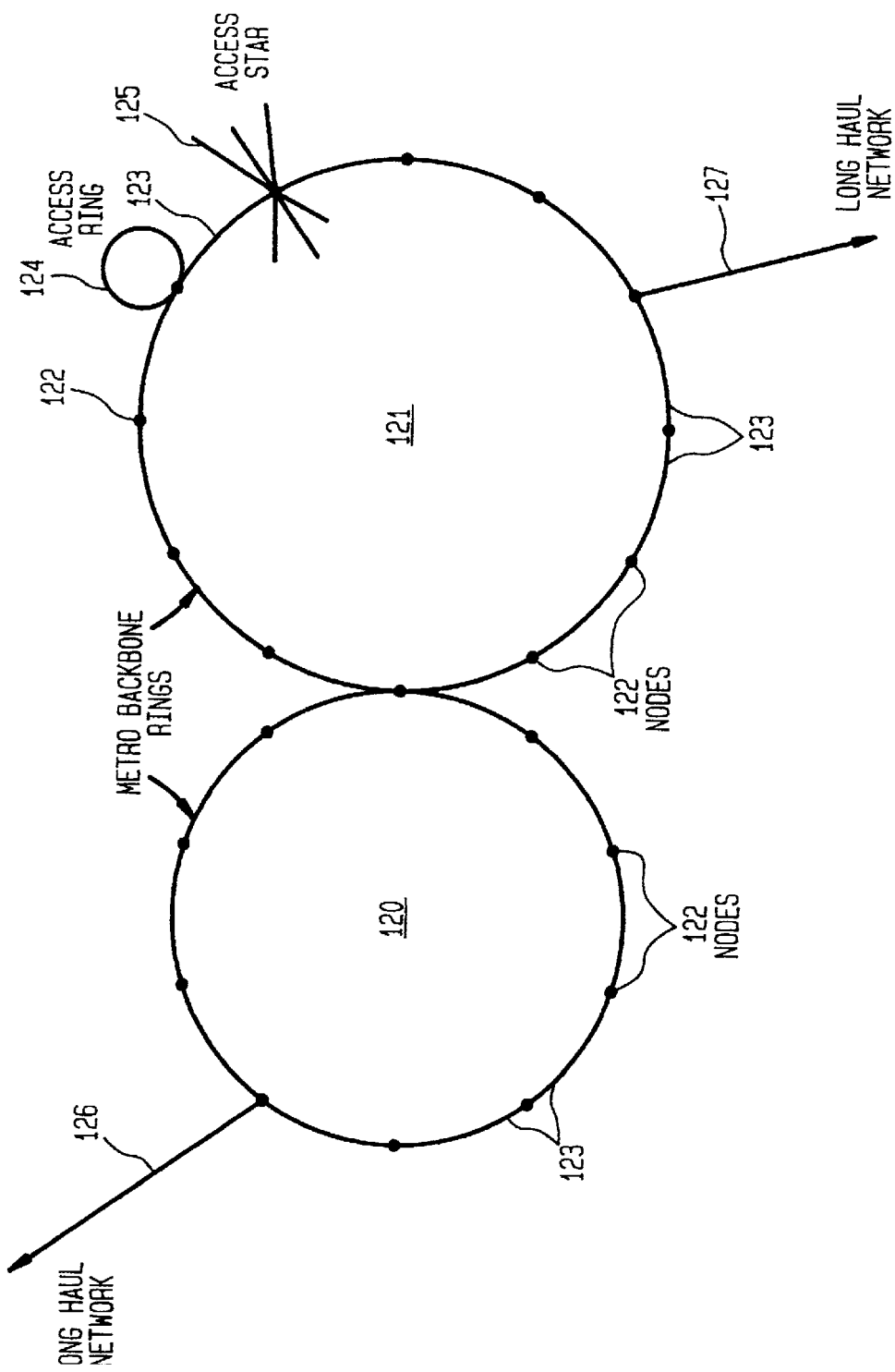
FIG. 12 is a schematic diagram of a metropolitan fiber system.

FIG. 12 is an illustrative MetroWave system. The schematic diagram includes Metro Backbone rings 120 and 121, generally configured as SONET rings. Rings contain from 8 to 16 nodes 122 defining 10–40 km-length nodal spans 123. Ring circumference is typically 120–200 km. A usual node 122 is provided with an optical amplifier and means for adding or dropping channels. Designated channels may be added or dropped at a node, while at the same time, other channels, perhaps amplified, will be retained in the ring and transmitted to a succeeding node. The Figure shows two rings 120 and 121 linked through a common node. In operation, any given channel is enabled to travel from any particular node to any other node, either on the same ring or on the adjoining ring. Design experience has ordinarily led to a maximum "wavelength path" distance on the order of 300 km.

Each node 122 likely includes an optical router (a "WDM" or "DWDM", with such term now designating the element responsible for performing the multiplexing/ demultiplexing functions fundamental to state-of-the-art WDM). A node may include provision for adding/dropping. Add/drop equipment accomodates local distribution of electrical, rather than photonic, signals, and must include means for O/E or E/O conversion. Two conventional forms of local distribution are shown—access ring 124 and access star 125. It is anticipated that photonic local distribution will replace electronic distribution. Photonic distribution systems may continue to take the form of rings or stars— possibly constructed of MetroWave fiber of the invention, although, less costly USF may be adequate for the purpose. The Figure shows connection made with long-haul networks 126 and 127. Utilization of MetroWave fiber for long haul, as discussed, is not precluded. For usual long-haul purposes, however, it is expected that a form of NZF fiber will continue to be preferred.

Figure 13:
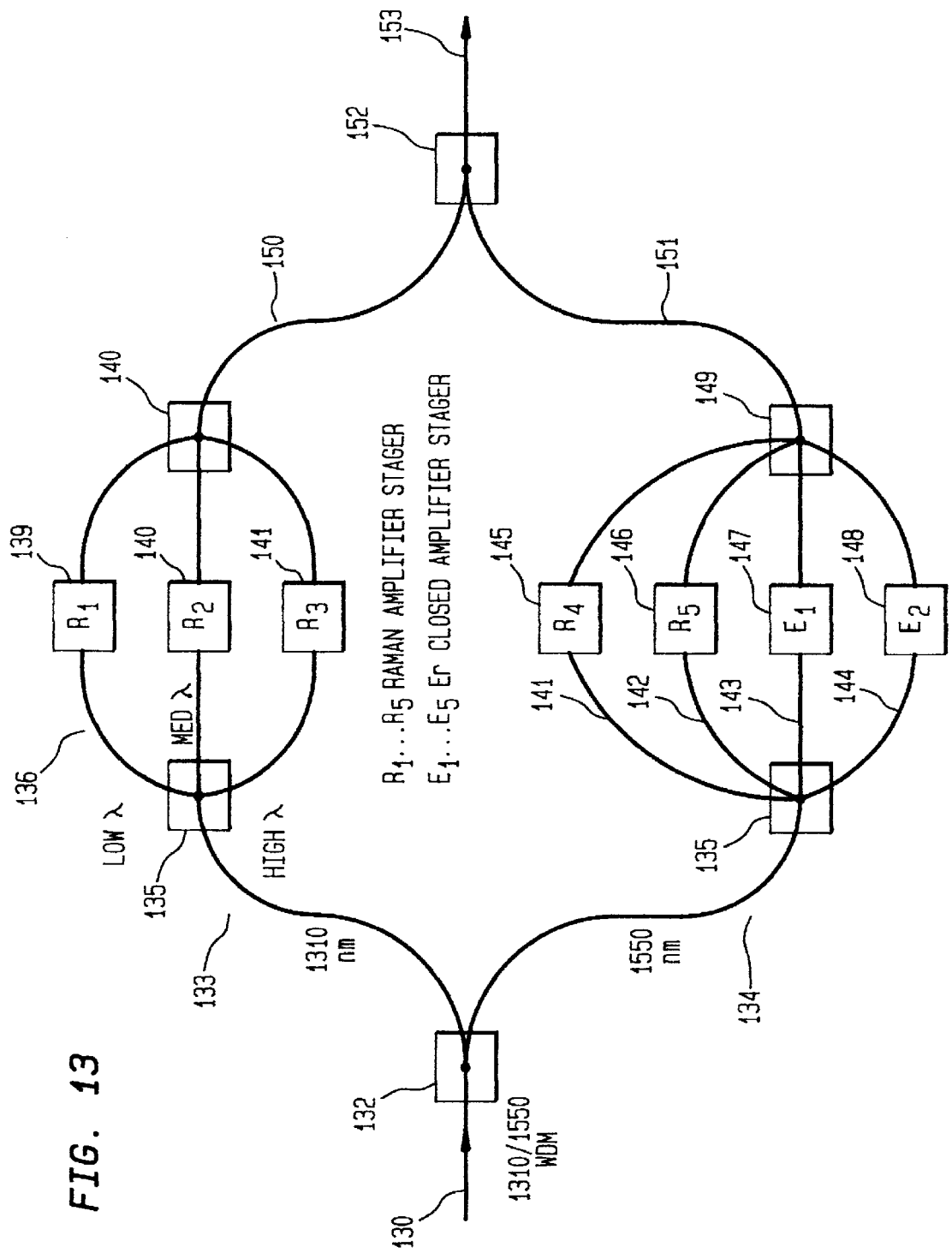
FIG. 13 is a schematic diagram of a multi-stage optical amplifier accommodating dual-window WDM operation, and suitable for use in the system of FIG. 12.

FIG. 13 is a schematic representation of a multi-stage 1310/1550 nm optical amplifier, representative of amplifiers included in the nodes of the Metro Backbone rings of FIG. 12. The amplifier shown is suitably used with the claimed systems, providing for simultaneous amplification of WDM channel sets in both windows. The amplifier shown provides for first separating the two bands—the 1310 band and the 1550 band—as introduced on incoming fiber line 130. Band separation is accomplished by WDM 132, properly regarded as "coarse WDM" 132 (to differentiate it from routers accommodating closely spaced channels of a WDM channel set). The 1310 nm and 1550 nm bands, now separated at 132, are routed along fibers 133 and 134, respectively, until coarse WDMs 135 separate them into component WDM sets. The 1310 nm band is shown as yielding three WDM sets 136, 137 and 138, which then pass through amplifiers 139, 140 and 141, thence to be recombined at coarse WDM 140. At the same time, the 1550 band is separated into WDM sets 141, 142, 143, 144 to be amplified respectively at amplifiers 145, 146, 147, 148, and recombined by coarse WDM 149. Finally, the amplified sets travel through fiber lines 150 and 151, are combined by coarse WDM 152, and exit over line 153.

The multi-stage amplifier of FIG. 13 is designed with a view to today's state-of-the-art. The significance of the EDFA in advancing WDM, due to its initial gain bandwidth of perhaps 12 nm, and its capability of simultaneously amplifying member channels of a WDM set, is recognized. Present day EDFAs have a greater bandwidth—perhaps 35 to 40 nm—owing to use of gain equalization filters which lessen the structure of the naturally occurring gain spectrum. Even this expanded bandwidth will be insufficient for the entire 1550 band, now made available by the present invention which, by one measure, encompasses the 160 nm range from 1460 nm to 1620 nm. The arrangement shown in the Figure provides for four amplifiers, with only 147 and 148 constituted of erbium-doped fiber. The design shown assumes amplifiers 145 and 146 to be Raman amplifiers, operating over the shorter wavelength portion of the 1550 nm band. WDM sets of the 1310 band are amplified by Raman amplifiers, as well. Amplifiers 139, 140 and 141 are designed to accommodate the three subbands 136–138, together representing the usable 1260 nm–1360 nm window illustratively available to MWF.

A considerable effort has been directed to design of multi-stage, very broadband optical amplifiers. A paper by M. Yamada et al., in Vol. 33, No. 8, *Elec. Lett,* in Apr. 10, 1997, at pages 710, 711, is representative. The parallel configuration shown combines two erbium-doped fiber amplifiers, the first using conventional silica-based glass and operating with an amplification band centered at 1550 nm, and the second using erbium-doped fluoride-based glass and operating with an amplification band centered at 1580 nm. The cascaded structure is regarded as having a flat amplification bandwidth of 54 nm by the designer.

Amplification over a 1550 nm optical bandwidth of 80 nm, has been demonstrated. A paper by Yan Sun et al., *Proceedings of the* 1997 11*th International Conference on Integrated Optics and Optical Fibre Communications and* 23*rd European Conference on Optical Communications,* IOOC-ECOC '97, Part 5 (of 5), Sep. 22–25, 1997, describes a two-band architecture (1570 nm–1600 nm, "L-band" and 1525 nm–1565 nm, "C-band"), entailing two stages—a first common to both bands, and a second stage having distinct gain sections in parallel. With its 80 nm of bandwidth, this amplifier accommodates 100 WDM channels with the proposed ITU standard channel spacing of 100 GHz.

Raman amplifiers, shown as operating in the 1310 nm window as well as for the two shorter wavelength subbands in the 1550 nm window, have enabled a useable bandwidth of 25–30 nm (see U.S. Pat. No. 5,623,508, issued Apr. 22, 1997). Comparable with a state-of-the-art EDFA, a major part of the 1260–1360 nm 1310 nm window, now made available, is accommodated by a three-stage Raman amplifier.

We claim:

1. Article comprising at least one optical fiber suitable for use in wavelength division multiplex systems, the fiber including a core and a clad, having an attenuation at 1550 nm≦0.25 dB/km, having a cut-off wavelength of less than 1300 nm and a dispersion slope at 1550 nm≦0.06 ps/(nm$^2$-km), the fiber having an average value of chromatic dispersion at 1550 nm, as measured over a fiber length of at least 2.2 km, which is of positive sign and of magnitude in the range of 1.0–8.0 ps/nm-km,

CHARACTERIZED IN THAT said fiber has a dispersion null point within the wavelength range of from 1350 nm to 1450 nm, and in that it has an average value of chromatic dispersion at 1310 nm, as measured over a fiber length of at least 2.2 km, which is of negative sign and of magnitude in the range of 1.0–8.0 ps/nm-km.

2. Article of claim 1 in which the fiber is encompassed within a coating, in which the index-of-refraction of the clad varies as measured radially, in which the clad is comprised of an outer cladding and a first annular region intermediate the core and outer cladding, the first annular region being of reduced index relative to the outer cladding.

3. Article of claim 2 in which the first annular region is adjacent the core and is of index of average absolute value at least 0.1% less than that of the outer cladding, and in which the fiber has a dispersion slope at 1550 nm≦0.05 ps/(nm$^2$-km).

4. Article of claim 3 in which the clad includes a second annular region adjacent the first annular region, the second annular region being of increased index relative to the outer cladding.

5. Article of claim 4 in which the second annular region is of index of average value at least 0.05% greater than that of the outer cladding.

6. Article of claim 5 in which the clad includes a third annular region adjacent the second annular region, the third annular region being of reduced index relative to the outer cladding.

7. Article of claim 2 in which the fiber is encompassed within dual coatings including a primary coating in direct contact with the fiber and a secondary coating about the primary coating.

8. Article of claim 2 including a plurality of optical fibers within a sheathing, so defining a cable.

9. Article of claim 8 including grouped fibers.

10. Article of claim 9 in which grouped fibers consist of groups, each in the form of a planar array.

11. Article of claim 2 comprising reeled product.

12. Article of claim 1 in which the average value of chromatic dispersion both at 1550 nm and 1310 nm is of magnitude in the range of 2.0–7.0 ps/nm-km.

13. WDM optical waveguide system comprising: a transmission line of optical fiber, the transmission line including at least one fiber span connecting first and second terminals; the first terminal including a first means for generating, modulating, and multiplexing a first set of modulated WDM channel carriers of a first system wavelength, for introduction into the fiber span; the second terminal including a second means for performing functions including demultiplexing the first set of modulated channel carriers; the fiber span including optical amplifiers; in which at least 90% of the fiber span consists of non-zero dispersion fiber having an average value of chromatic dispersion at 1550 nm within the range of +1.0 to +8.0 ps/nm-km, and having average attenuation at 1550 nm$\leq$0.25 dB/km; in which the fiber span includes at least one optical amplifier; in which the first system wavelength is within a first low-attenuation window of the non-zero dispersion fiber, the first window comprising a first wavelength band including 1550 nm,

CHARACTERIZED IN THAT said non-zero dispersion fiber has: a dispersion null point within the wavelength range of from 1350 nm to 1450 nm; an average value of chromatic dispersion at 1310 nm within the range of −1.0 to −8.0 ps/nm-km, and attenuation at 1310 nm$\leq$0.50 dB/km; and in that the first terminal includes third means for generating, modulating, and multiplexing a second set of modulated WDM channel carriers of a second system wavelength, for introduction into the said fiber span, and in that the second terminal includes fourth means for performing functions including demultiplexing the second set of modulated channel carriers; in which the second system wavelength is within a second low-attenuation window of the non-zero dispersion fiber, the second window comprising a second wavelength band including 1310 nm.

14. System of claim 13 in which the fiber span comprises a plurality of nodal spans, each nodal span comprising a length of the non-zero dispersion fiber interconnecting fiber nodes; in which at least some nodes include optical amplifier means for amplifying the first and second sets of modulated channel carriers; and in which at least some nodes include means for adding or dropping selected carriers of the sets.

15. System of claim 14 in which the fiber span is a portion of a metro backbone ring.

16. System of claim 15 in which at least some nodes are connected with access lines for distributing selected carriers of the sets.

17. System of claim 14 in which such an amplifier means consists of a multi-stage amplifier for simultaneously amplifying at least selected channels within the first and second sets of modulated channel carriers.

18. System of claim 17 in which the multi-stage amplifier includes separating means for separating the first and second sets, set amplifiers for amplifying channels of the sets, and combining means for recombining the now-amplified sets.

* * * * *

(12) EX PARTE REEXAMINATION CERTIFICATE (5569th)
United States Patent
Judy et al.

(10) Number: US 5,905,838 C1
(45) Certificate Issued: Oct. 17, 2006

(54) DUAL WINDOW WDM OPTICAL FIBER COMMUNICATION

(75) Inventors: Arthur F. Judy, Atlanta, GA (US); David Kalish, Roswell, GA (US); Raymond Bradfield Kummer, Lilburn, GA (US); David Wayne Peckham, Norcross, GA (US); William Alfred Reed, Summit, NJ (US)

(73) Assignee: Fitel USA Corporation, Norcross, GA (US)

Reexamination Request:
No. 90/007,028, May 7, 2004

Reexamination Certificate for:
Patent No.: 5,905,838
Issued: May 18, 1999
Appl. No.: 09/025,195
Filed: Feb. 18, 1998

(51) Int. Cl.
*G02B 6/02* (2006.01)
*H04J 14/02* (2006.01)
*H03B 10/12* (2006.01)

(52) U.S. Cl. .................. 385/123; 385/100; 385/124; 385/126; 398/81; 398/82; 398/142; 398/147

(58) Field of Classification Search ................ 385/100, 385/109, 123–126; 359/124, 341
See application file for complete search history.

(56) References Cited

U.S. PATENT DOCUMENTS

| 4,435,040 A | 3/1984 | Cohen et al. |
| 5,278,687 A | 1/1994 | Jannson et al. |
| 5,392,154 A | 2/1995 | Chang et al. |
| 5,546,210 A | 8/1996 | Chraplyvy et al. |
| 5,715,346 A | 2/1998 | Liu |
| 5,877,879 A | 3/1999 | Naito |
| 5,978,130 A | 11/1999 | Fee et al. |

FOREIGN PATENT DOCUMENTS

EP 09233053 5/1997

OTHER PUBLICATIONS

Yangsheng Gao, Xisheng Cong, Shuisheng Jian, "Attenuation–optimized Dispersion–Flattened Quadruple–Clad Fibers with Moderate F–Doping in the First Inner Cladding" IEEE photonics Technology Letters. vol. 4, No. 6, Jun. 1992—p. 638–p. 641.

Richard Lundin, "Minimiation of the chromatic dispersion over a broad wavelength range in a single–mode optical fiber", 2219 Applied Optics 32(1993)20 Jun., No. 18 p. 3241–3245.

Le Nguyen Binh, Su–Vun Chung, "Generalized approach to single–mode dispersion–modified optical fiber design" XP 000633910—Monash University, Clayton, Victoria 3168 Melbourne Opt. Eng. 35(8) p. 2250–p. 2261 (Aug. 1996).

M. Yamada, H. Ono, T. Kanamori, S. Sudo and Y. Ohishi, Broadband and gain flattened amplifier composed of a 1.55μm–band and a 1.58 μm band Er3–doped fibre amplifier in a parallel configuration—Electronics Letters 10th Apr. 1997 vol. 33, No. 8, p. 710–p. 711.

*Primary Examiner*—Erik Kielin

(57) ABSTRACT

Simultaneous dense WDM operation in both the 1310 nm and 1550 nm transparency windows of silica-based optical fiber, is enabled by a fiber design providing for nulled dispersion within a critically positioned wavelength range. Design provides for values of dispersion in both windows sufficiently low for desired per-channel bit rate, and, at the same time, sufficiently high to maintain effects of non-linear dispersion within tolerable limits for WDM operation. Fiber fabrication and system design are described.

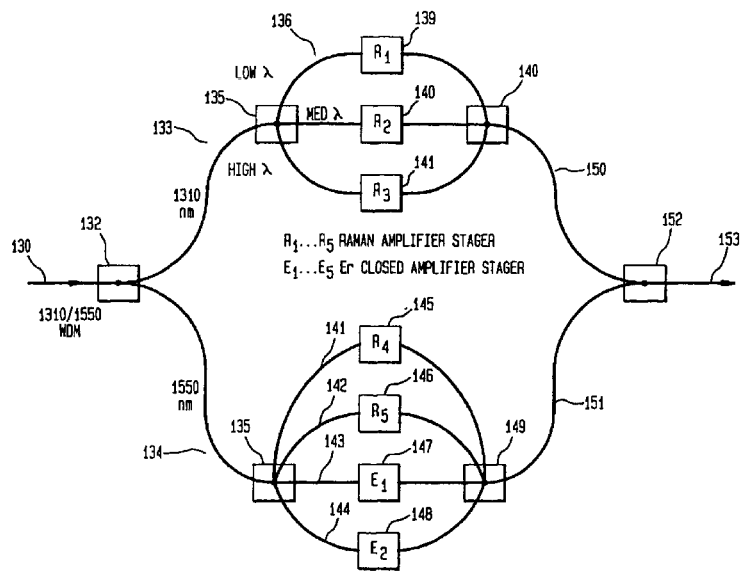

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 13–18 is confirmed.

Claim 1 is determined to be patentable as amended.

Claims 2–12, dependent on an amended claim, are determined to be patentable.

New claim 19 is canceled.

1. Article comprising at least one optical fiber suitable for use in wavelength division multiplex systems, the fiber including a core and a clad, having an attenuation at 1550 nm $\leq 0.25$ dB/km, having a cut-off wavelength of less than 1300 nm and a dispersion slope at 1550 nm $\leq 0.06$ ps/(nm$^2$-km), the fiber having an average value of chromatic dispersion at 1550 nm, as measured over a fiber length of at least 2.2 km, which is of positive sign and of magnitude in the range of 1.0–8.0 ps/nm-km,

CHARACTERIZED IN THAT said fiber has *an effective area $A_{eff} \geq 42$ μm$^2$ at 1550 nm and* a dispersion null point within the wavelength range of from 1350 nm to 1450 nm, and in that it has an average value of chromatic dispersion at 1310 nm, as measured over a fiber length of at least 2.2 km, which is of negative sign and of magnitude in the range of 1.0–8.0 ps/nm-km.

* * * * *